Aug. 24, 1937.   P. J. FEYKERT   2,090,863
RAILING
Filed May 27, 1935
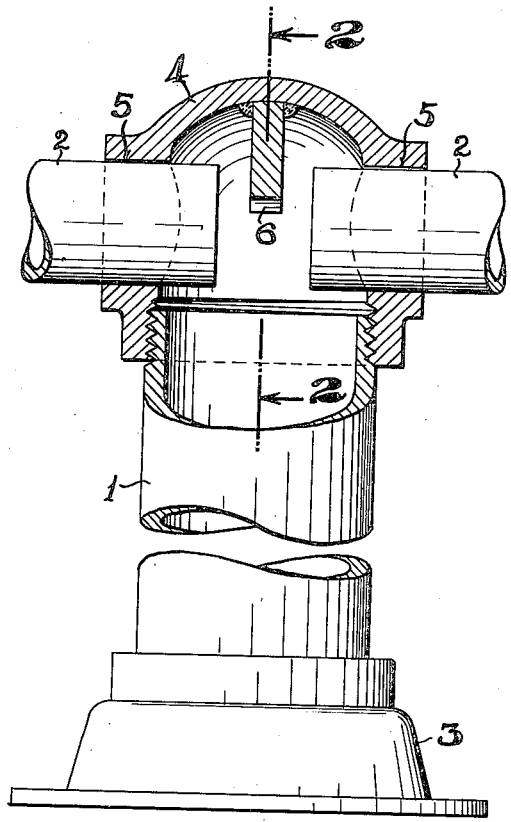
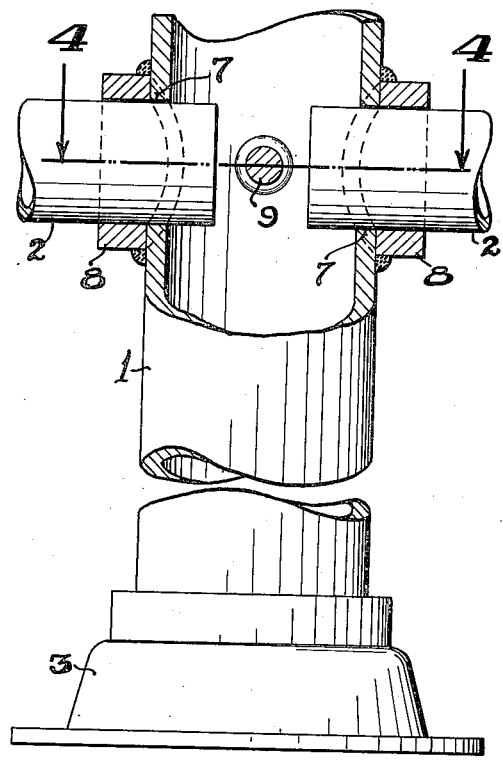
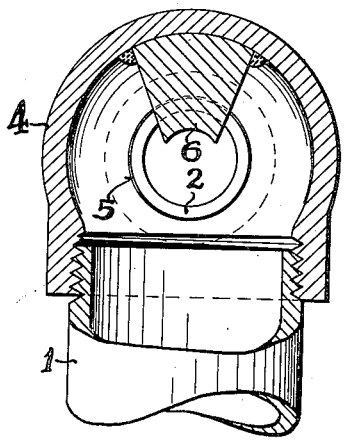
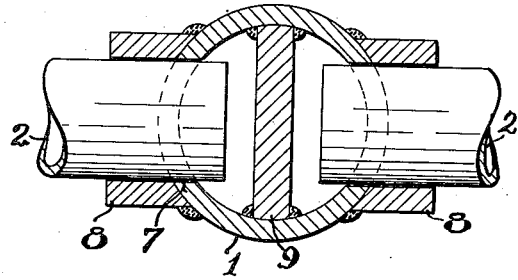
INVENTOR
Peter J. Feykert
BY J. E. Trabucco
ATTORNEY Patented Aug. 24, 1937

2,090,863

UNITED STATES PATENT OFFICE 2,090,863

RAILING

Peter J. Feykert, San Francisco, Calif.

Application May 27, 1935, Serial No. 23,542

5 Claims. (Cl. 287—54)

This invention relates to improvements in expansion joints for pipes, rods or fittings which are used in the manufacture and installation of hand rails, barriers, or the like.

It has heretofore been the practice in manufacturing and erecting hand railings or barriers, to take care of the ordinary expansion and contraction problems by having the horizontal pipes or rods so fitted into the upright standards that the former may be movably supported by the latter. One of the primary objections, however, to the railing constructions heretofore commonly used was that holes had to be drilled into the fittings or standards so that pins or stop members could be positioned to prevent displacement of the horizontal pipes or rods. Moisture entering the holes in the standards or fittings soon caused the unprotected and ungalvanized metal at the sides of the holes to corrode and thereby assume an unsightly appearance. The primary object of my invention is to overcome these problems by providing an improved railing construction in which the standards and fittings are not formed with holes for the insertion of pins or rivets, but rather are provided with internal stop members that not only effectively prevent the displacement of the horizontal rails, but make possible a construction whereby unsightly holes and pins are entirely eliminated.

Other objects and advantages will present themselves or will be specifically pointed out in the description of my invention which is to follow.

In the accompanying drawing:—

Fig. 1 is a side view, partly in section, of a railing constructed in accordance with my invention;

Fig. 2 is a sectional view taken on the line 2—2 of Fig. 1;

Fig. 3 is a side view, partly in section, of a part of a railing embodying another form my invention may assume; and Fig. 4 is a sectional view taken on the line 4—4 of Fig. 3.

Referring to the drawing, the numeral 1 designates one of several hollow upright standards or posts which are employed to support a plurality of substantially horizontal rails 2. The lower end of the standard is provided with an enlarged base section 3 which is ordinarily bolted or otherwise suitably secured to a flooring or other structure upon which the railing is erected.

Screwed or otherwise suitably secured to the top end of the standard 1 is a dome or other suitably shaped fitting 4, preferably having openings 5 in its opposite side walls which are adapted to slidably receive the ends of two rails 2. Secured internally as by welding or other suitable means to the dome-shaped top side of the fitting 4 is a downwardly disposed stop member 6, which is interposed between the adjacent but separated ends of the rails 2. The rails are ordinarily positioned so their adjacent ends are spaced from the stop member 6, thereby allowing for the expansion which ordinarily takes place when the railing is exposed to the warm rays of the sun. The stop member 6, being positioned between the ends of the rails 2, prevents the abnormal displacement of the said rails with respect to one another, and also with respect to the standards supporting them.

In the form shown in Figs. 3 and 4, the lower rails 2 of the railing are supported by standards 1 in which oppositely disposed holes 7 are provided for slidably receiving the ends of said rails. Secured as by welding or other suitable means to the standard 1 at points around the holes 7 are rings or sleeves 8 through which the rails 2 slidably extend. So as to prevent displacement of the rails 2 with respect to one another and also with respect to the standard 1, I have internally secured to the standard as by welding or other suitable means, a diametrically disposed stop member 9. The stop member 9 is positioned in spaced relation to the adjacent ends of the rails 2, thereby permitting the normal expansion thereof without danger of buckling or distortion.

Although I have described the preferred forms of my invention with considerable particularity, it is apparent to those skilled in the art that minor changes in regard to the details of construction may be made without departing from the principles set forth herein. It is therefore to be understood that the scope of my invention shall be controlled by the appended claims rather than by the exact disclosures herein made.

Having described my invention, what I claim is:

1. In a railing construction, a supporting standard, a fitting on the standard having a side opening therein, a rail slidably extending through the opening, and a stop member secured to the fitting at a point internally thereof, the said stop member being normally positioned in spaced relation to the end of the rail, but so positioned that the rail would be intercepted if the latter was moved inwardly beyond its normal position, the said rail and stop member being so positioned with respect to one another that the rail can expand and contract without exerting a pressure upon the standard.

2. In a railing construction, a hollow standard having a side opening therein, a rail removably extending through the opening and into the hollow standard, and a stop member secured to and positioned inside the standard and positioned to intercept the end of the rail, the said stop member being secured to a side of the standard at a point inside thereof and normally positioned in spaced relation to the end of the rail which extends into the opening of the standard.

3. In a railing construction, a hollow standard having an opening therein, a rail slidably extending into the standard through the opening, and an inwardly projecting stop member located entirely inside the standard and extending diametrically across the interior thereof for preventing the rail from being moved inwardly beyond a certain point, the said stop member and that part of the rail which extends into the said standard being normally spaced from one another, whereby the rail may expand and contract without exerting a pressure upon the said standard.

4. In a railing construction, a standard having oppositely disposed openings in its side walls, a pair of rails slidably extending through the openings into the standard, and a diametrically disposed stop member secured to the inside surface of the standard and positioned between the adjacent ends of the rails, the said stop member and the inwardly disposed ends of the rails being spaced apart.

5. In a railing construction, a standard, a fitting on the standard having oppositely disposed openings therein, a pair of rails slidably extending into the fitting through the said openings, the inwardly disposed ends of the rails being spaced apart, and a stop member interposed between the ends of the rails, the said stop member extending diametrically across the interior of the fitting and normally positioned in spaced relation to the adjacent ends of the rails.

PETER J. FEYKERT.